April 9, 1946.　　　C. G. A. ROSEN ET AL　　　2,398,191
INTERNAL-COMBUSTION ENGINE
Filed Sept. 27, 1943　　　2 Sheets-Sheet 2
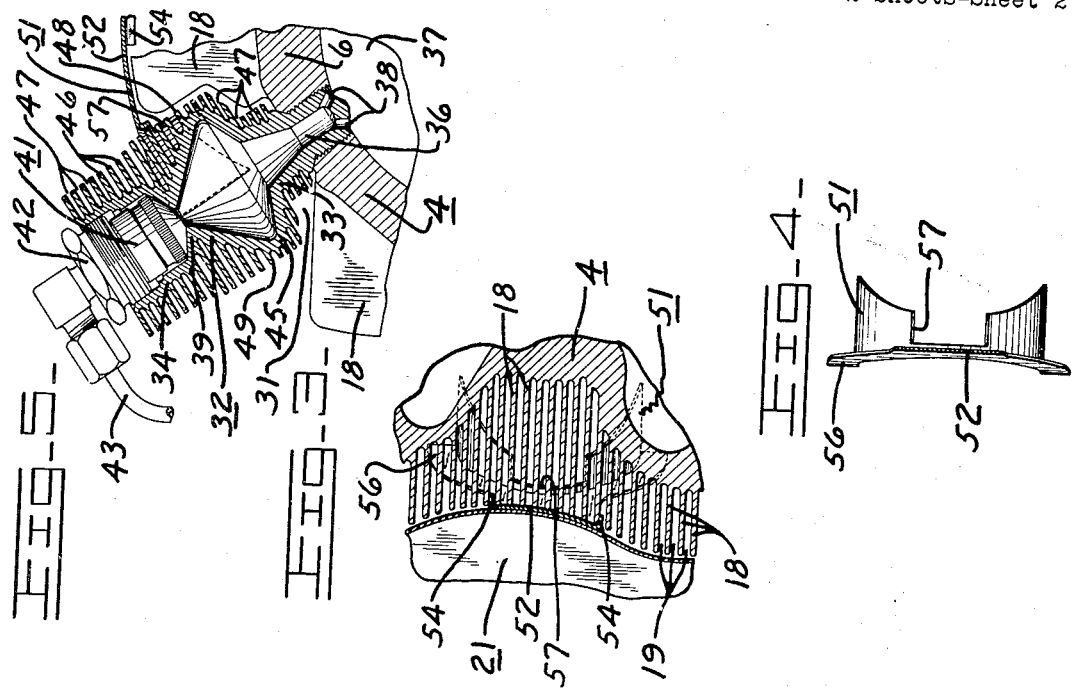
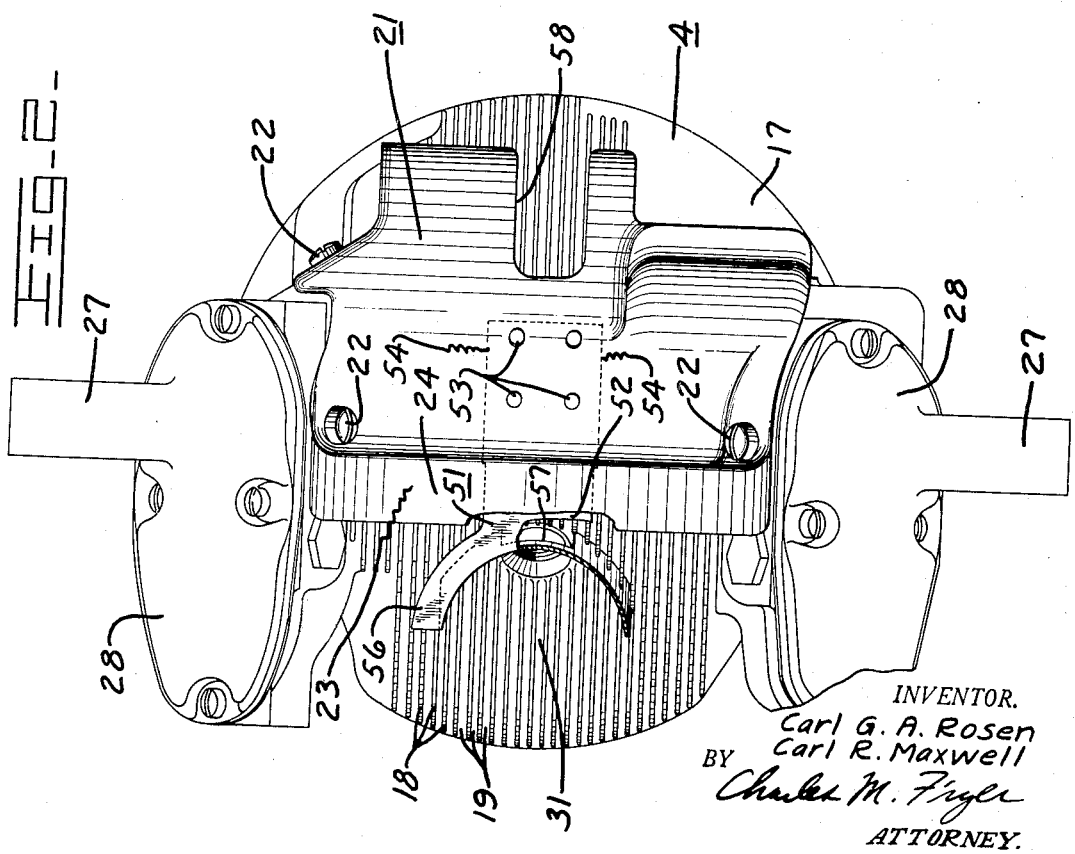
INVENTOR.
Carl G. A. Rosen
Carl R. Maxwell
BY Charles M. Fryer
ATTORNEY.

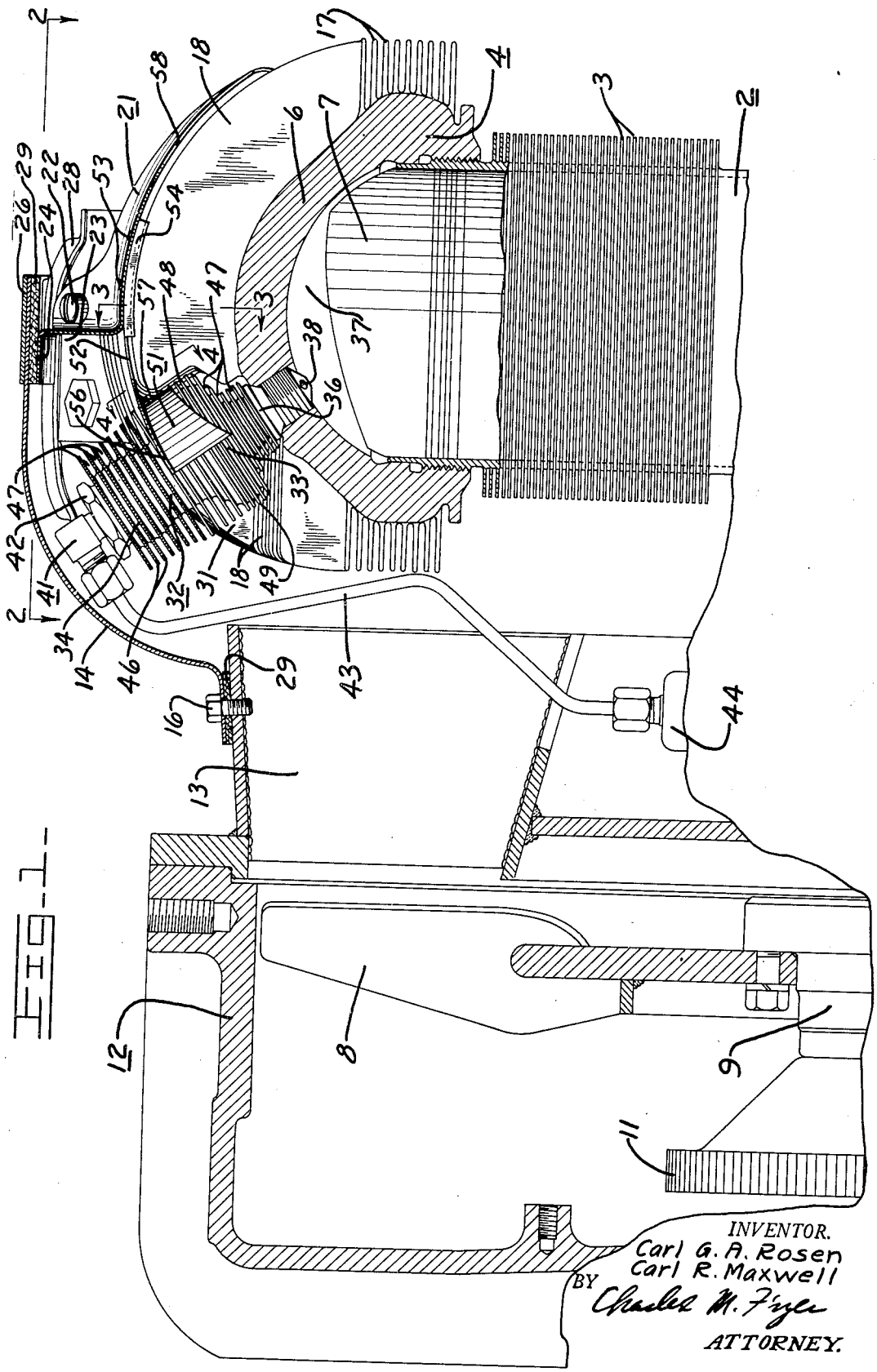

Patented Apr. 9, 1946

2,398,191

UNITED STATES PATENT OFFICE 2,398,191

INTERNAL-COMBUSTION ENGINE

Carl G. A. Rosen, Peoria, and Carl R. Maxwell, Washington, Ill., assignors to Caterpillar Tractor Co., San Leandro, Calif., a corporation of California Application September 27, 1943, Serial No. 503,902

6 Claims. (Cl. 123—171)

Our invention relates to internal combustion engines, and more particularly to a radial compression ignition or Diesel engine of the air-cooled type, and which has an auxiliary combustion chamber in the form of a precombustion chamber.

Objects of our invention, among others, are the provision, in an engine of the character described, of an improved air-cooled auxiliary combustion chamber arrangement, and baffle arrangement for insuring adequate cooling at the downstream side of the auxiliary combustion chamber, all of which are of a relatively simple construction. Other objects of our invention will become apparent from a perusal of the following description thereof.

Referring to the drawings:

Fig. 1 is a fragmentary sectional elevational view along the crankshaft axis, of a form of radial internal combustion engine embodying the construction of our invention; only those parts of the structure being shown, which are required for illustration of our invention.

Fig. 2 is an elevational view taken in a plane indicated by line 2—2 in Fig. 1; the combined auxiliary combustion chamber and fuel injection nozzle supporting unit being omitted from the view.

Fig. 3 is a fragmentary section taken in a plane indicated by line 3—3 in Fig. 1.

Fig. 4 is a sectional elevation of the auxiliary combustion chamber air baffle means; the view being taken in a plane indicated by line 4—4 in Fig. 1.

Fig. 5 is a longitudinal sectional view of the combined auxiliary combustion chamber and fuel injection nozzle supporting unit, illustrated in elevation in Fig. 1.

The engine illustrated is a radial Diesel or compression ignition engine of the type disclosed in our assignee's copending application by Lloyd E. Johnson and Carl R. Maxwell, Serial No. 499,892, filed August 25, 1943. However, it is to be understood that the features of our invention, although particularly adapted for a compression ignition engine, may be employed in other types of internal combustion engines. With reference to Figs. 1 and 2, the engine illustrated includes a plurality of air-cooled cylinders 2 (only one of which is shown in Fig. 1), having cooling fins and which are circumferentially or peripherally disposed about an annular-like crankcase (not shown). Fixedly secured to each cylinder by screwing is a dome-shaped cylinder head 4 having head wall 6; and mounted for reciprocation in each cylinder 2 is a working piston 7.

For feeding of air to effect air cooling of the engine, a blower or fan 8 is secured for rotation with the crankshaft of the engine by connection to flywheel 9 having ring gear 11 thereon to enable engagement thereof with starting mechanism (not shown); the fan 8 and flywheel 9 being enclosed by a cover structure 12 provided with openings 13 for permitting flow of a stream of cooling air against the cylinders of the engine. An annular shroud 14 for confining the air stream flow from openings 13 to the parts of the engine to be cooled, is detachably connected, adjacent the upstream edge thereof by capscrews 16, to cover structure 12, and at the downstream edge to the engine heads in a manner to be subsequently explained.

Extending outwardly from the inner portion of head wall 6 are a plurality of spaced cooling fins 17 which lie in planes extending transversely with respect to the cylinder axis. On the outer or dome portion of head wall 6 are a plurality of spaced cooling fins 18 which extend in the direction of and substantially parallel to the cylinder axis and longitudinally of the line of draft of the air stream, and form passages 19 therebetween which are open to the line of draft of the air. Because of the dome-shaped character of the head, it is desirable to provide baffle means for confining flow of cooling air along the downstream side of such head. Such baffle means comprises a baffle plate structure 21 positioned over the outer edges of the head cooling fins 18 and which is detachably secured by means of capscrews 22.

The upstream edge portion of baffle plate structure 21 does not extend substantially beyond the axis of the cylinder, and is formed with an outwardly extending air collecting pocket portion 23 terminating in an outer flange 24 over which the downstream edge of shroud 14 is secured by means of a split clamping band 26 which passes around all of the flanges 24 about the various radially disposed cylinders. As is shown more clearly in Fig. 2, laterally extending ears 27 are provided on valve covers 28 to support band 26 in the spaces between adjacent cylinders of the engine. To minimize vibration, and also serve as air seals, the attaching edges of shroud 14 are mounted over pads 29 of a suitable resilient material, such as felt, which are clamped between such shroud edges and the parts to which they are connected.

At the upstream side thereof, head wall cooling fins 18 are arranged to form a recess or cavity 31 receiving a unit 32 which includes an auxiliary combustion chamber part 33 within recess 31 adjacent head wall 6, and a fuel injection nozzle supporting part 34 extending beyond the outer edges of cooling fins 18. The combined auxiliary combustion chamber and fuel injection nozzle supporting unit is generally of the type illustrated in our assignee's Patent No. 2,148,505, dated February 28, 1939, wherein the auxiliary combustion chamber is of the precombustion chamber type which includes a tubular inner end portion 36 having a detachable screw-threaded connection on head wall 6, and which communicates with main combustion chamber 37 in the engine cylinder, through orifices 38.

A tapered nozzle supporting seat and shield 39 is formed within the unit; and a suitable fuel injection nozzle 41 is clamped in position against such seat by a suitable nut 42 screwed into unit 32; fuel being supplied to the nozzle by a fuel injection line 43 connected to a fuel injection pump 44, only a portion of which is illustrated in Fig. 1 of the drawings. Preferably, for manufacturing convenience, unit 32 is made of two sections secured together at 45 by any suitable means, such as welding.

Both the auxiliary combustion chamber part and fuel injection nozzle supporting part of unit 32 are air-cooled; and for thus purpose, such unit is formed with spaced cooling fins 46 which extend transversely with respect to the axis of the unit and also with respect to the head cooling fins 18, and which consequently form passages 47 open to the line of draft of the air, and also to passages 19 between cooling fins 18. As a result, the air stream can flow through recess 31, and the passages 19 communicating with such recess at the downstream side thereof. The downstream side 48 of auxiliary combustion chamber 33 is shielded from the air stream by its upstream side 49 which faces the air stream, and is consequently cooled adequately. Therefore, to provide for adequate cooling of downstream side 48 of the auxiliary combustion chamber, we provide baffle means for directing air around such side.

Such baffle means includes an arcuate baffle plate structure 51 in recess 31 and which partially envelops downstream side 48 of the auxiliary combustion chamber. Baffle plate structure 51 is, preferably, integral with a strip 52 secured by suitable means, such as riveting 53, to the underside of baffle plate structure 21 which thus provides a support for baffle plate structure 51. Preferably, spaced flanges 54 are formed on strip 52 which are adapted to straddle a portion of cooling fins 18 to provide a snug fit for the assembly; and such strip 52 has arcuate reinforcing flanges 56 adjacent baffle 51.

Arcuate baffle 51 provides a means for collecting and directing the air about the downstream side of the auxiliary combustion chamber; and to enhance this function without impeding too much the flow of air through fin passages 19 leading from recess 31, baffle 51 tapers, so as to be wider at its upstream side than at its downstream side. Also, baffle 51 is formed with an opening 57 in its downstream side, substantially in line with strip 52, and in line with an opening 58 formed in the downstream edge of baffle plate structure 21 for the purpose of reducing the resistance to the flow of air, to thereby enhance the quantity of air flow about the downstream side of the auxiliary combustion chamber for insuring adequate cooling. In this connection, strip 52 forms a relatively narrow continuation part of baffle plate structure 21 which extends to a position closely adjacent to the downstream side of the auxiliary combustion chamber, thus cooperating with openings 57 and 58 to provide a duct-like passage for guiding the flow of air about the downstream side of the auxiliary combustion chamber.

The engine illustrated is now in use as the power plant on a form of land vehicle; and for this reason, it is provided with an independent fan 8 for creating the cooling air stream. However, when employed for aircraft propulsion, such fan may be omitted as the propeller of the aircraft or the air stream created by propulsion of such aircraft will provide sufficient air for cooling.

We claim:

1. An internal combustion engine adapted to be cooled by air comprising a cylinder head wall, spaced cooling fins on the wall forming passages open to the line of draft of the air, the fins being arranged to provide a recess adjacent said wall, an auxiliary combustion chamber in said recess, spaced cooling fins on said auxiliary combustion chamber forming passages open to the line of draft of the air and to the cooling fin passages on the wall, a baffle structure over the wall cooling fins at the downstream side of the auxiliary combustion chamber to provide for adequate cooling of the downstream side of the head, and an arcuate baffle structure in said recess adjacent the downstream side of the auxiliary combustion chamber for directing air about such side; the baffle structure over the wall cooling fins having a portion extending to a position adjacent the downstream side of the auxiliary combustion chamber, the arcuate baffle structure having a recess, and the baffle structure over the wall cooling fins having a recess in the downstream edge thereof in line with said first mentioned recess, to enhance flow of air about the downstream side of the auxiliary combustion chamber.

2. An internal combustion engine adapted to be cooled by air comprising a dome shaped cylinder head wall, spaced cooling fins on the wall extending outwardly therefrom in the direction of the cylinder axis and forming passages therebetween open to the line of draft of the air, the fins being arranged to provide a recess adjacent said wall, an auxiliary combustion chamber in said recess, spaced cooling fins within said recess and on said auxiliary combustion chamber extending transversely with respect to said head wall cooling fins and forming passages open to the line of draft of the air and to said head wall cooling fin passages, a baffle structure over the head wall cooling fins at the downstream side of the auxiliary combustion chamber to provide for adequate cooling of the downstream side of the head, and an arcuate baffle structure in said recess adjacent the downstream side of the auxiliary combustion chamber for directing air about such side; the baffle structure over the head wall cooling fins having a portion extending to a position adjacent the downstream side of the auxiliary combustion chamber, the arcuate baffle structure having a recess, and the baffle structure over the head wall cooling fins having a recess in the downstream edge thereof in line with said first mentioned recess to enhance flow of air about the downstream side of the auxiliary combustion chamber.

3. In an internal combustion engine having a cylinder head wall with spaced cooling fins in alignment with a draft of cooling air and arranged to provide a recess adjacent the upstream side of the cylinder head, an auxiliary combustion chamber in said recess, cooling fins on said chamber, baffle means on the downstream side of the cylinder head cooling fins, and a second baffle means on the downstream side of the auxiliary combustion chamber cooling fins, said second baffle means being secured to and supported by the first named baffle means.

4. In an internal combustion engine having a cylinder head wall with spaced cooling fins in alignment with a draft of cooling air and arranged to provide a recess adjacent the upstream side of the cylinder head, an auxiliary combustion chamber in said recess, cooling fins on said chamber, baffle means on the downstream side of the cylinder head cooling fins, and a second baffle means on the downstream side of the auxiliary combustion chamber cooling fins, said second baffle means being secured to and supported by the first named baffle means and extending into said recess.

5. In an internal combustion engine having a cylinder head wall with spaced cooling fins in alignment with a draft of cooling air and arranged to provide a recess adjacent the upstream side of the cylinder head, an auxiliary combustion chamber in said recess, cooling fins on said chamber, baffle means on the downstream side of the cylinder head cooling fins, and a second baffle means on the downstream side of the auxiliary combustion chamber cooling fins, said second baffle means being secured to and supported by the first named baffle means and extending into said recess, and substantially aligned openings in the downstream sides of said baffle means.

6. In an internal combustion engine having a cylinder head wall with spaced cooling fins in alignment with a draft of cooling air and arranged to provide a recess adjacent the upstream side of the cylinder head, an auxiliary combustion chamber in said recess, cooling fins on said chamber, baffle means on the downstream side of the cylinder head cooling fins, and a second baffle means on the downstream side of the auxiliary combustion chamber cooling fins, and substantially aligned openings in the downstream sides of said baffle means.

CARL G. A. ROSEN.
CARL R. MAXWELL.